W. CLAYTON AND G. NODDER.
COOLER.
APPLICATION FILED MAR. 26, 1920.

1,375,210.

Patented Apr. 19, 1921.
3 SHEETS—SHEET 1.

Inventors
W. Clayton
G. Nodder
By H. P. Kerslake
Attorney

W. CLAYTON AND G. NODDER.
COOLER.
APPLICATION FILED MAR. 26, 1920.

1,375,210.

Patented Apr. 19, 1921.
3 SHEETS—SHEET 3.

Inventors
W. Clayton
G. Nodder
By H. R. Kerslake
Attorney

UNITED STATES PATENT OFFICE.

WILLIAM CLAYTON, OF LIVERPOOL, AND GERALD NODDER, OF WALLASEY, ENGLAND.

COOLER.

1,375,210.  Specification of Letters Patent.  Patented Apr. 19, 1921.

Application filed March 26, 1920. Serial No. 369,061.

*To all whom it may concern:*

Be it known that we, WILLIAM CLAYTON, residing at 162 North Hill street, Prince's Park, Liverpool, England, and GERALD NODDER, residing at 162 Belvidere road, Wallasey, Cheshire, England, subjects of the King of Great Britain and Ireland, have invented certain new and useful Improvements Relating to Coolers, of which the following is a specification.

This invention relates to the manufacture of edible fats, such as margarin and lard substitutes, and has for its object to provide improved means for cooling or solidifying the material used in such manufacture.

The invention comprises a series of flat hollow members adapted to provide a zig-zag path for cooling liquid, and scrapers revolving in compartments formed by the said members, the said compartments communicating to form a zig-zag path for the material to be treated.

In the accompanying sheets of explanatory drawings:—

Figure 1:
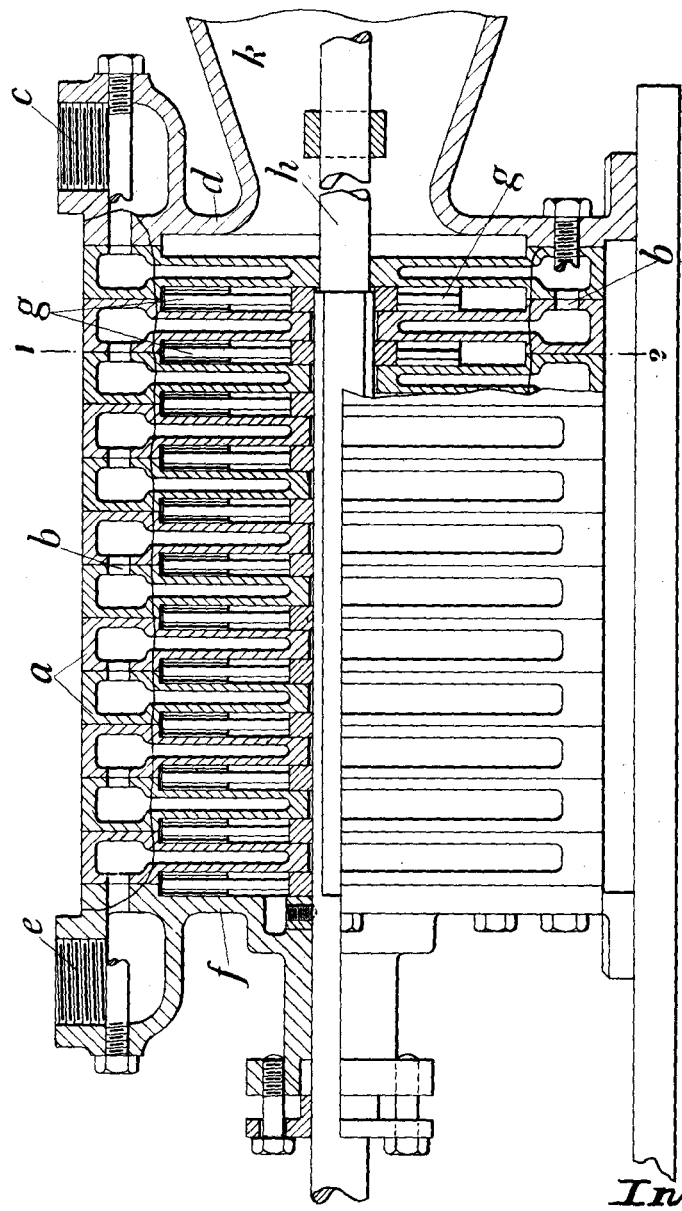
Figure 1 is a part sectional side elevation of a cooler constructed in accordance with this invention.
Figure 2:
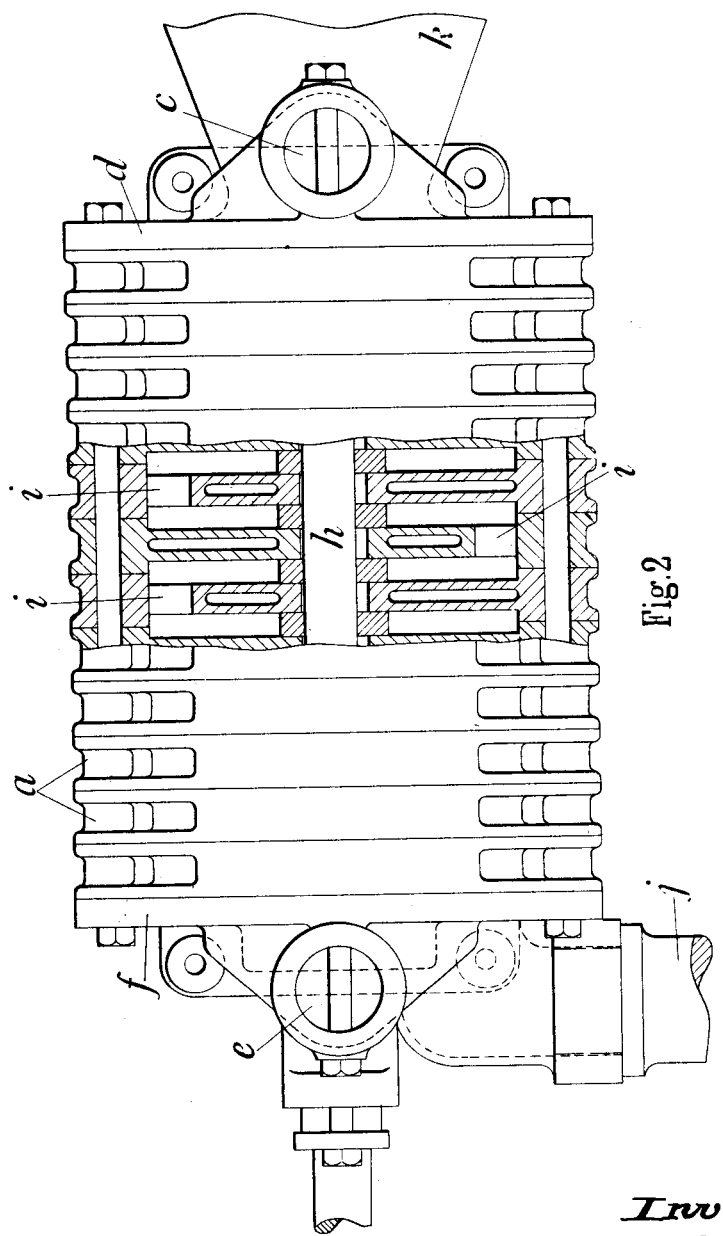
Fig. 2 is a part sectional plan and Fig. 3 a cross-section on line 1—2 of Fig. 1.
Figure 3:
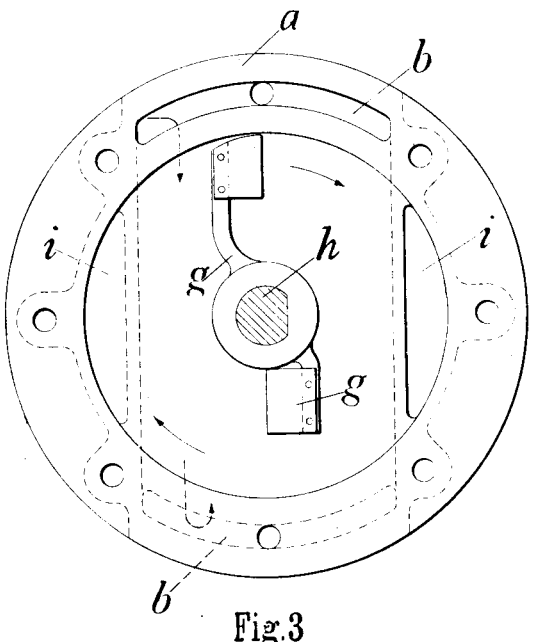

The cooler illustrated consists of a series of hollow disk like sections $a$ whose interiors communicate by passages $b$ at alternate diametrical positions, the construction forming a zig-zag passage for the cooling fluid. The latter enters by a passage $c$ in the end cover $d$ and flows to an outlet $e$ in the other end cover $f$.

Between and inclosed by the fixed cooling disks, are arranged a number of radial scrapers $g$ secured to a rotating shaft $h$. The narrow circular chambers in which the scrapers revolve communicate by passages $i$ at diametrically opposite positions in the adjoining plates which positions are at right angles to the passages $b$ and form a zig-zag path for the fat which is fed into the cooler at $j$. The fat may be forced through the cooler by a pump or under fluid head of pressure. From the cooler the fat may pass through the end $k$ directly to other apparatus for operating on the same, or to a discharge pipe.

By contact with the surfaces of the disks $a$ the fat is suddenly cooled and solidified, and is continuously removed from such surfaces by the scrapers in order that the whole of the material passing through the apparatus may be subjected to an effective cooling action.

Having thus described our invention what we claim as new and desire to secure by Letters Patent is:—

In coolers for use in the manufacture of edible fats, the combination comprising a plurality of flat hollow members, a pair of end covers, passages in the said members communicating alternately on opposite sides of the longitudinal axis of the members, inlet and outlet passages in the end covers communicating with the passages in the said members, a longitudinal shaft, and scrapers on the shaft rotatable in compartments formed by the said members, and passages in the said members communicating with the said compartments alternately on opposite sides of the longitudinal axis and with inlet and outlet apertures, substantially as described.

In testimony whereof we have signed our names to this specification.

WILLIAM CLAYTON.
GERALD NODDER.

Witnesses:
WILLIAM PIERCE,
HENRY JOSEPH GREGORY.